US007019492B1

United States Patent
Baker et al.

(10) Patent No.: US 7,019,492 B1
(45) Date of Patent: Mar. 28, 2006

(54) HAND-HELD, MANUALLY-OPERATED BATTERY CHARGER WITH EMERGENCY LIGHT

(75) Inventors: Wendal E. Baker, Ennis, MT (US); Michael J. Lely, Bozeman, MT (US)

(73) Assignee: Innovative Solutions & Technologies, LLC, Bozeman, MT (US)

( * ) Notice: Subject to any disclaimer, the term of this patent is extended or adjusted under 35 U.S.C. 154(b) by 75 days.

(21) Appl. No.: 10/419,311

(22) Filed: Apr. 18, 2003

Related U.S. Application Data

(60) Provisional application No. 60/375,561, filed on Apr. 25, 2002.

(51) Int. Cl.
*H02J 7/00* (2006.01)

(52) U.S. Cl. ...................... 320/114; 320/107
(58) Field of Classification Search ............... 320/114, 320/107, 110, 123, 138, 160, 162, 136, 163; 362/192, 193, 202, 295; 429/99–100, 52
See application file for complete search history.

(56) References Cited

U.S. PATENT DOCUMENTS

| | | | | |
|---|---|---|---|---|
| 4,315,301 A | * | 2/1982 | Jimena | 362/193 |
| 4,360,860 A | * | 11/1982 | Johnson et al. | 362/192 |
| 4,701,835 A | * | 10/1987 | Campagnuolo et al. | 362/192 |
| 5,552,973 A | * | 9/1996 | Hsu | 362/192 |
| 5,839,817 A | * | 11/1998 | Wei | 362/192 |
| 5,880,532 A | * | 3/1999 | Stopher | 290/1 E |
| 5,905,359 A | * | 5/1999 | Jimena | 320/114 |
| 5,949,215 A | * | 9/1999 | Takakura | 320/114 |
| 6,140,863 A | * | 10/2000 | Fujisawa | 327/540 |
| 6,485,169 B1 | * | 11/2002 | Ragner | 362/500 |
| 2004/0130156 A1 | * | 7/2004 | Hartman et al. | 290/1 A |
| 2004/0204180 A1 | * | 10/2004 | Liao | 455/573 |
| 2005/0111218 A1 | * | 5/2005 | Lee | 362/192 |

FOREIGN PATENT DOCUMENTS

| | | | |
|---|---|---|---|
| EP | 0786849 A1 | * | 7/1997 |
| GB | 2299457 A | * | 10/1996 |
| JP | 05056569 A | * | 3/1993 |
| JP | 10210673 A | * | 8/1998 |
| JP | 2000056775 A | * | 2/2000 |

* cited by examiner

*Primary Examiner*—Donald Sparks
*Assistant Examiner*—Lawrence Luk
(74) *Attorney, Agent, or Firm*—Shane P. Coleman; Holland & Hart LLP

(57) ABSTRACT

A hand-held, manually-operated battery charger is disclosed having a generator that creates a voltage when a handle is turned by a user. A bridge rectifier is connected to the output of the generator and converts the voltage to a DC voltage, regardless of whether the handle is turned clockwise or counterclockwise. A supercapacitor stores the DC voltage. The charger also includes a connection port that is adapted to receive a connection cord. The connection cord receives the voltage from the supercapacitor and provides the voltage to a battery-charging port of a battery-operated device. The charger also includes a superbright LED that also receives the voltage from the supercapacitor. Voltage is switched between the connection port and the LED, such that the voltage is diverted to the connection port when the connection cord is attached thereto and is diverted to the LED when the connection cord is not attached.

21 Claims, 5 Drawing Sheets

HAND-HELD, MANUALLY-OPERATED BATTERY CHARGER WITH EMERGENCY LIGHT

CROSS-REFERENCE TO RELATED APPLICATION

This application claims priority from co-pending provisional application No. 60/375,561, filed Apr. 25, 2002, which is hereby incorporated by reference.

FIELD OF INVENTION

The present invention relates generally to manual generation of electricity. More particularly, it relates to a hand crank-operated battery charger for a wireless telephone or other electronic device.

BACKGROUND

In the field of wireless telephones and similar portable electronic devices, rechargeable battery technology has become increasingly important. Users of such devices rely on the batteries to be charged so that the device may be used at all times, in all locations. Typically, batteries are charged using a conventional outlet (e.g., 120 volts AC) and a transformer with a cord that connects to the device, and sometimes in connection with a "docking station" or similar base used to recharge the battery of the device.

A problem occurs when the battery requires charging and the user cannot access a conventional power supply. For example, a user may be traveling away from such outlets or may not have the transformer and other charging accessories available. In an emergency situation, it is particularly important for the user to be able to use the wireless telephone or similar device. Although manual battery chargers exist for this purpose, conventional devices are difficult to use and fail to reliably meet the needs of users of wireless telephones and other devices. What is needed is an improved manually-operated battery charger.

SUMMARY

A hand-held, manually-operated battery charger is disclosed having a generator that creates a voltage at an output and a handle operably connected to the generator. The handle may be turned clockwise or counterclockwise to cause the generator to create the voltage. A bridge rectifier is connected to the output of the generator and allows the handle to be turned in either direction to create the voltage. A supercapacitor stores the voltage that is generated. The charger also includes a connection port that is adapted to receive a connection cord. The connection cord receives the voltage from the supercapacitor and provides the voltage to a battery-charging port of a battery-operated device. The charger also includes a superbright light-emitting diode (LED) that also receives the voltage from the supercapacitor. The charger switches the voltage between the connection port and the LED, such that the voltage is diverted to the connection port when the connection cord is attached to the connection port and is diverted to the LED when the connection cord is not attached to the connection port.

A battery charger is also disclosed having a means for generating a voltage using a hand crank and a means for limiting the voltage to a maximum voltage value. The batter charger includes a means for storing the voltage and a means for providing the voltage to a connection cord and to a light source. The battery charger switches the voltage between the connection cord and to the light source, depending upon whether the connection cord is attached to the charger.

A method of charging a battery is also disclosed. A voltage is generated in response to a user's manual rotation of a hand crank. The voltage is limited to a maximum value and is stored using a supercapacitor. A selection is made between a connection port and a light source, and the voltage is provided to the connection port when the connection port is selected and to the light source when the light source is selected.

SUMMARY OF DRAWINGS

The detailed description will refer to the following drawings, wherein like numerals refer to like elements, and wherein.

DETAILED DESCRIPTION

Figure 1:
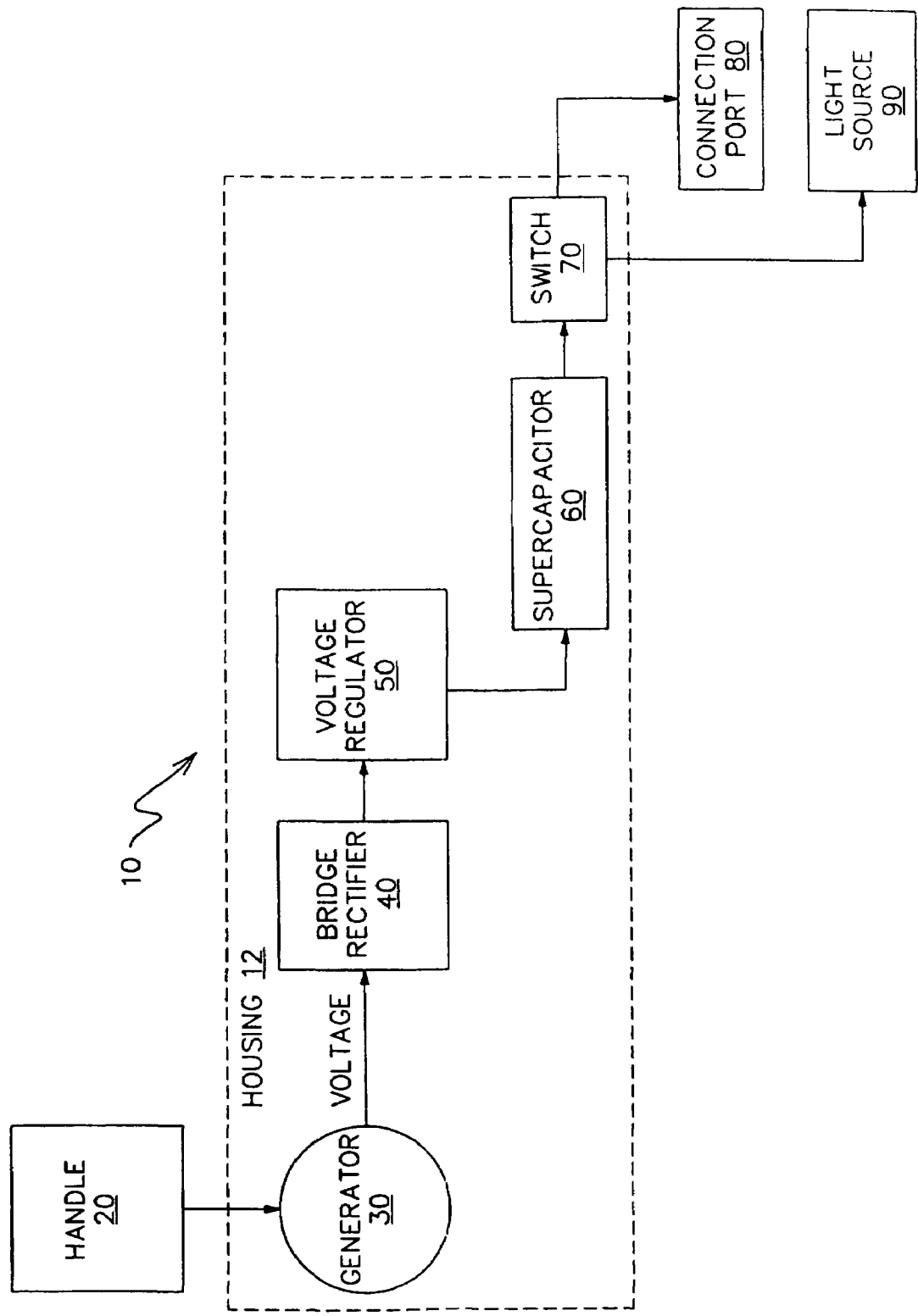
FIG. 1 shows a block diagram of the handheld battery charger.

FIG. 1 shows a block a diagram of the hand-held battery charger 10. The charger 10 includes a handle 20 connected to a generator 30. In use, a user may grip the handle 20 with one hand and rotate the handle 20 clockwise or counterclockwise with the other hand, causing the generator 30 to create an alternating current (AC) voltage. The voltage is provided to a bridge rectifier 40 that converts the AC voltage of the generator 30 into a direct current (DC) voltage. In one embodiment, the bridge rectifier 40 is a full-wave rectifier that allows the handle 20 to be turned either clockwise or counterclockwise to create the DC voltage. A voltage regulator 50 is connected to an output of the bridge rectifier 40. The voltage regulator 50 limits the voltage to a maximum value. In one embodiment, the charger 10 is used for charging wireless telephones. In this embodiment, the maximum value of the voltage may be limited by the voltage regulator 50 to approximately a range of 4.5–12 volts DC to ensure that the voltage does not overload the battery to be charged. In one embodiment, the voltage is limited to 6.2 volts.

The voltage regulator 50 is connected to a supercapacitor 60. The supercapacitor 60 receives the regulated voltage from the voltage regulator 50 and stores the voltage. As used herein, a "supercapacitor" refers to any capacitor, group of capacitors, or other device capable of creating a capacitance of at least 100 microfarads. In one embodiment, the supercapacitor has a capacitance of 100 microfarads. In other embodiments, a larger capacitance is used. The charger 10 uses the stored voltage to drive a connection port 80 and/or a light source 90. In the embodiment of FIG. 1, a switch 70 is connected to the supercapacitor 60 and diverts the voltage from the supercapacitor 60 to either the connection port 80 or the light source 90. In the embodiment of FIG. 1, the charger 10 also includes a housing 12 that envelopes the generator 30, bridge rectifier 40, voltage regulator 50, super capacitor 60, and switch 70. The housing 12 is a lightweight plastic or metal housing, in one embodiment, that protects the electronic components of the charger 10 from water, dust, and other elements.

Figure 2:
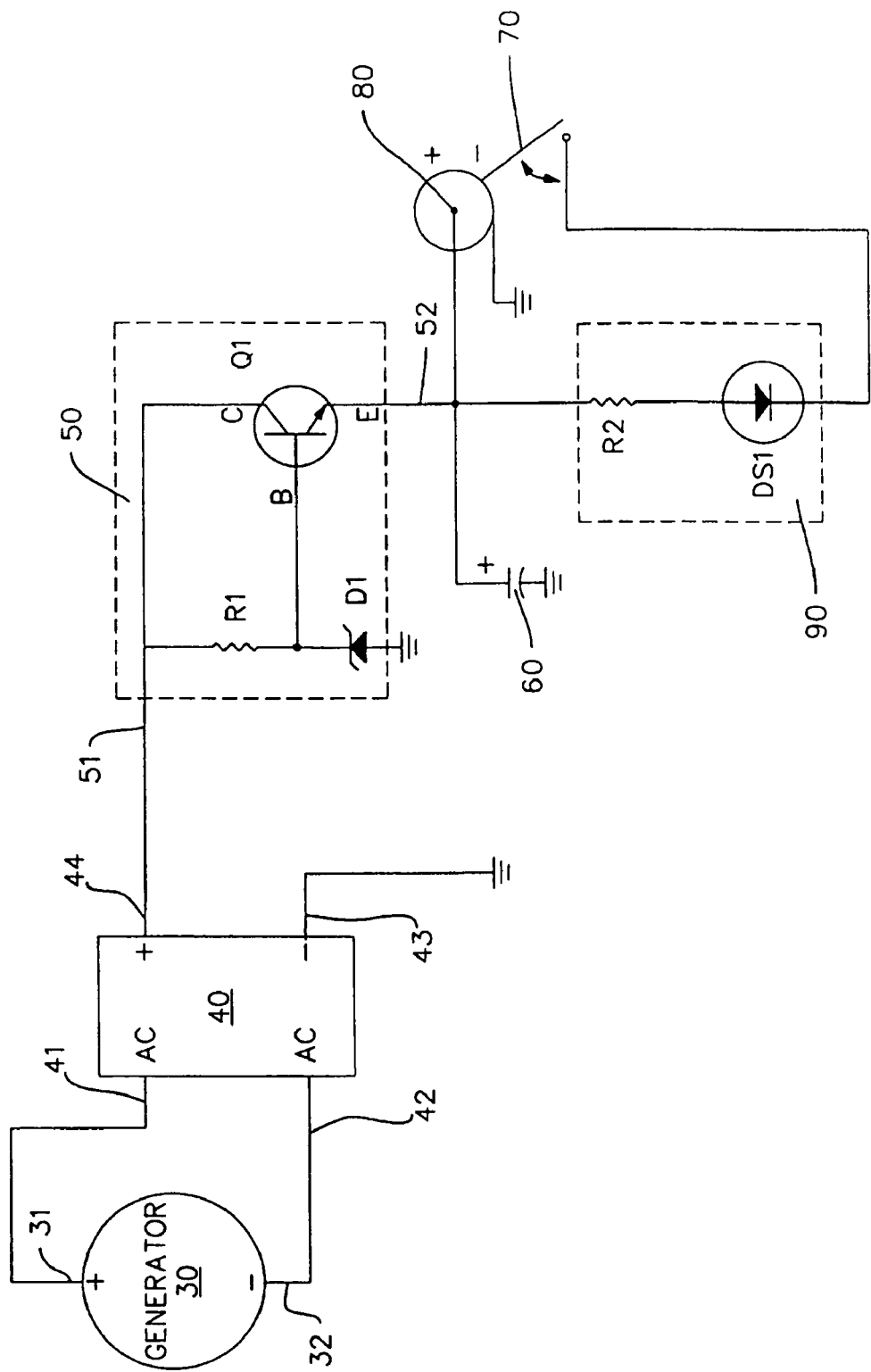
FIG. 2 shows a schematic of one embodiment of electronic portions of the battery charger.

FIG. 2 shows a schematic of one embodiment of electronic portions of the battery charger 10. The generator 30 has two outputs 31, 32 that connect to inputs 41, 42 of the bridge rectifier 40. The bridge rectifier 40 receives the AC voltage from the generator 30 and converts the voltage to a DC voltage. The rectifier 40 in the example of FIG. 2 is a full-wave rectifier that allows the handle (20 in FIG. 1) to turn in either direction (clockwise or counterclockwise) to cause the generator 30 to create the voltage. The rectifier 40 includes a negative a output terminal 43 that is connected to ground. The other output terminal 44 of the rectifier 40 provides the DC voltage to a voltage regulator 50. In the embodiment shown in FIG. 2, the regulator 50 includes an input 51 that is connected to a resistor R1 and to a collector C of a transistor Q1. The resistor R1 provides a feedback voltage to a base B of the transistor. The transistor Q1 is an npn bi-polar junction transistor (BJT). The emitter E of the transistor Q1 is connected to an output 52 of the voltage regulator 50. In the embodiment of FIG. 2, the voltage regulator 50 uses a zener diode D1 to limit the voltage. The zener diode D1 is connected between the base B of the transistor Q1 and ground. In one embodiment, the output voltage at the output 52 is limited to 6.2 volts using a zener diode D1 having a value of 6.8 volts. In one embodiment, the voltage regulator 50 may be adjusted by the user to specify different voltage limits, for example, for different devices to be charged.

The output 52 of the voltage regulator 50 is connected to a supercapacitor 60. The other terminal of the supercapacitor 60 is connected to ground. The supercapacitor 60 stores the voltage output of the voltage regulator 50 and smoothes power ripple. In one embodiment, multiple supercapacitors (e.g., 60) may be used and or a battery pack may also be incorporated into the design to store the voltage. In the embodiment of FIG. 2, the stored voltage is provided to a light source 90 and/or to a connection port 80. In the example of FIG. 2, the voltage from the supercapacitor 60 is provided to both the light source 90 and the output port 80, and a switch 70 is used to connect ground to either the output port 80 or the light source 90. In the embodiment of FIG. 2, the light source 90 comprises a superbright light emitting diode (LED) DS1 and a resistor R2 that regulates power to the LED. As used herein, a "superbright" LED refers to any LED that has a brightness of at least 3,000 millicandela (mcd). In one embodiment, the LED has a brightness in the range of 6,000 to 10,000 mcd. In one embodiment, the light source 90 comprises two or more superbright LEDs.

In one embodiment, the switch 70 is activated by the insertion of a connection cord (not shown) into the connection port 80. A connection cord is a cord that connects the battery charger 10 to a battery to be charged, such as a battery in wireless telephone. When the connection cord is attached to the port 80, the voltage is diverted entirely to the port 80, where the voltage is made available to the connection cord. When no connection cord is connected to the port 80, the switch 70 causes the voltage to be diverted to the light source 90, in order to illuminate the superbright LED DS1. In one embodiment, when the connection cord is connected to the connection port 80, but no battery is connected to the other end of the connection cord, the light source 90 does not illuminate and the switch 70 still diverts the voltage to the connection port 80.

Figure 3:
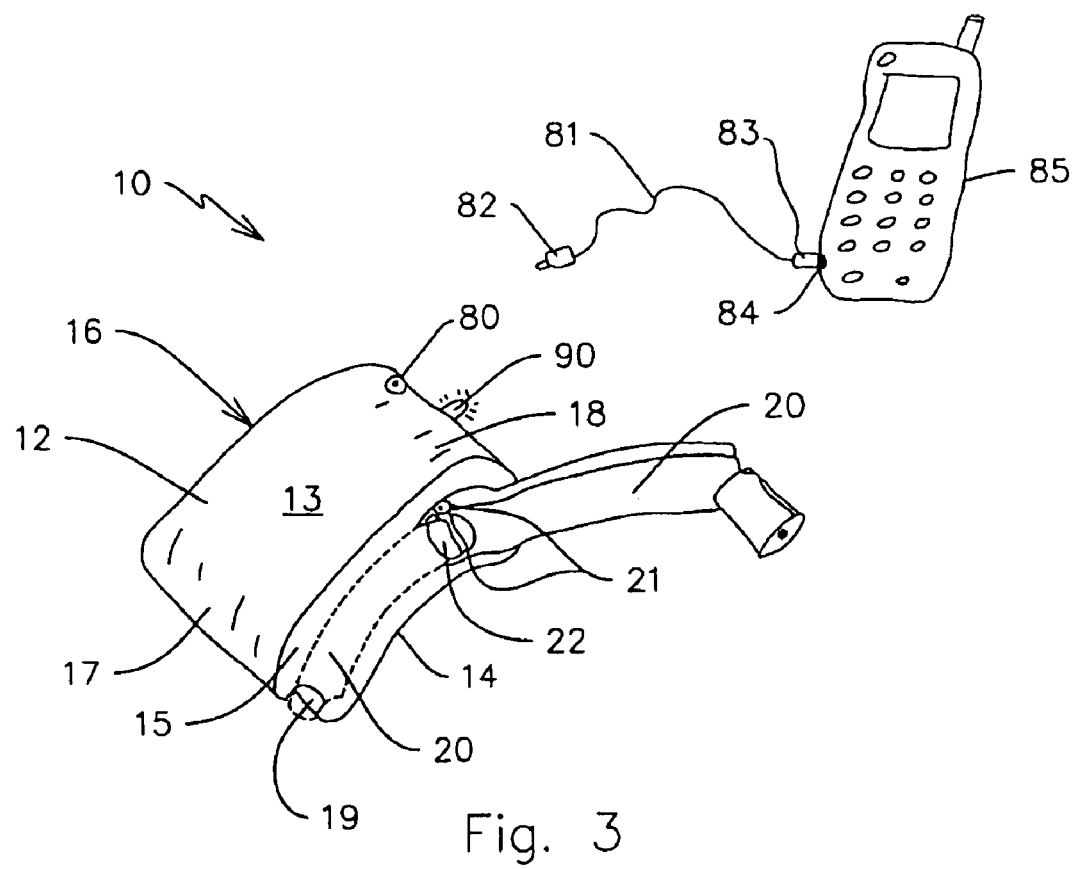
FIG. 3 shows a perspective view of one embodiment of the charger in use with a wireless telephone.

FIG. 3 shows a perspective view of one embodiment of the charger 10 in use with a wireless telephone 85. The charger 10 includes a generally curved housing 12 that encloses the generator 30, bridge rectifier 40, the supercapacitor 60, and the switch 70. The housing 12 may be formed, for example, from a lightweight plastic material. In the example of FIG. 3, the housing 12 includes top side 13 that is generally convex and a bottom side 14 that is generally concave and generally parallel to the top side 13. This generally curved embodiment facilitates the user's holding of the housing 12 while turning the handle 20. The sides 15, 16 of the housing 12 are generally flat and are substantially parallel to each other in this embodiment. The sides 15, 16 are substantially perpendicular to the top and bottom sides 13, 14. The housing 12 also includes ends 17, 18 that are both curved in such a manner that they are substantially convex. The ends 17, 18 are contiguous with the upper and lower sides 13, 14. In one embodiment, the housing 12 may be formed from two contiguous pieces of material that are connected by screws or similar connectors. In one two-piece embodiment, the top side 13 and bottom side 14 are part of separate pieces, respectively.

The handle 20 is pivotally connected to a connector 22 at pivot points 21, for example, formed by a pin passing through the connector 22. The connector 22 is, in turn, connected to the generator 30 contained within the housing 12. A series of internal gears (not shown) are used to set the rotational speed of the generator 30. The series of gears cause the generator 30 to turn at a rate according to a gear ratio relative to turns of the handle 20. In one embodiment, the gear ratio is in the range of 36:1 to 300:1. In one embodiment, the gear ratio is 72:1. In one embodiment, the generator 30 is a bi-directional 6-volt DC motor that outputs approximately 6 volts. The gear ratio in one embodiment of the 6-volt generator is adapted create a current of 450–500 mA (and a voltage of 6 volts) when the handle 20 is turned at a rate of 2 revolutions per second.

In FIG. 3, the handle 20 is shown in an operable position. The dashed lines show a storage position of the handle 20, in which the handle 20 engages a cavity 19 formed in the outside of an end 17 of the housing 12. The cavity 19 allows the handle 20 to store in a compact manner when the charger 10 is not in use. The cavity 19 also holds the handle 20 in such a manner that it prevents the handle 20 from turning inadvertently when the charger 10 is in the storage position. In use, the handle 20 is rotated clockwise or counterclockwise to cause the generator 30 to create the voltage. The voltage is provided to a connection port 80 and/or a light source 90.

As shown in FIG. 3, the connection port 80 and the light source 90 protrude from the housing 12 and may be accessed from the outside of the housing 12. In one embodiment, the connection port 80 is substantially flush with the outer surface of the housing 12. FIG. 3 also shows a wireless telephone 85 with a connection cord 81 used to charge a battery of the telephone 85. The connection cord 81 has a first end 82 that connects to the connection port 80 of the charger 10 and a second end 83 that connects to a battery-charging port 84 of the telephone 85. When the first end 82 of the connection cord 81 is connected to the connection port 80 of the charger 10, the voltage is automatically provided to the telephone 85 to charge the phone's battery (not shown). When the connection cord 81 is not connected to the connection port 80, the switch (70 in FIG. 2) diverts the voltage entirely to the light source 90, causing the light source 90 to illuminate.

Figure 4:
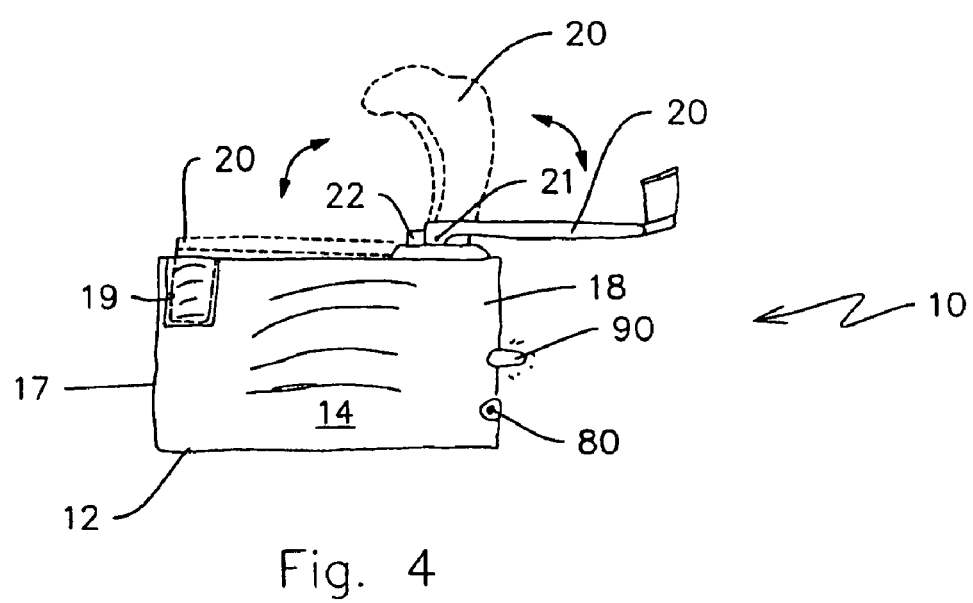
FIG. 4 shows a view of the bottom side of one embodiment of the charger to illustrate the pivoting nature of the handle.

FIG. 4 shows a view of the bottom of the charger 10 to illustrate the pivoting action of the handle 20. As shown in FIG. 4, the housing 12 has a bottom side 14 that is generally concave. In FIG. 4, the handle 20 is shown in an operable position in which the handle 20 may be turned to create a voltage with the generator 30. The dashed lines of FIG. 4 show the handle 20 as it may be pivoted into a storage position. The handle 20 pivots about the connecter 22 at a pivot point 21 to pivot into a storage position in which a portion of the handle 20 is received by a cavity 19 of the housing 12. In one embodiment, the handle 20 also functions as a clip for attaching the charger 10 to the user's belt, or a car visor, or similar objects.

Figure 5:
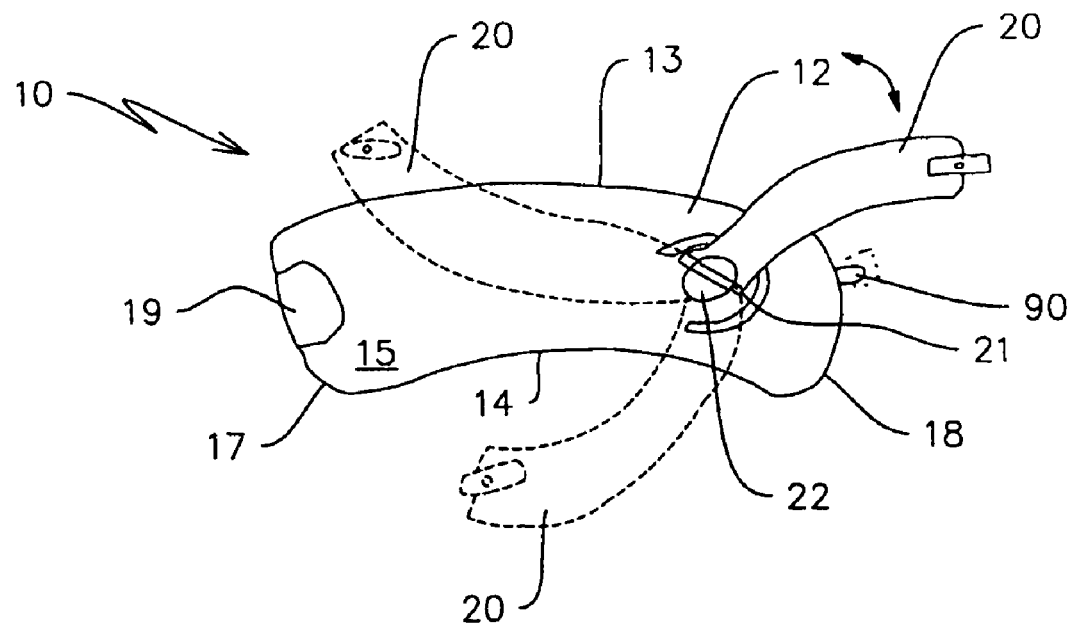
FIG. 5 shows a side view of one embodiment of the charger illustrating the rotation of the handle relative to the housing.

FIG. 5 shows a side view of the charger 10 illustrating the rotation of the handle 20 relative to the housing 12. In use, a user holds the housing 12 in one hand and the handle 20 in another hand, and rotates the handle 20 clockwise or counterclockwise relative to the housing 12, as illustrated by the dash lines. As the handle 20 is turned, the connector 22 provides a voltage created by the generator 30 contained within the housing 12. When a connection cord (81 in FIG. 3) is connected to the connection port (80 in FIG. 3) the voltage is provided to the connection cord (81 in FIG. 3). When no connection cord (81 in FIG. 3) is attached to the connection port (80 in FIG. 3) the voltage is provided to the light source 90 and causes the light source 90 to illuminate.

In one embodiment, the housing 12 is approximately two inches wide (measured from side 15 to side 16), two and one-half inches long (measured from end 17 to end 18), and one and one-half inches tall (measured from the top side 13 to the bottom side 14). In one embodiment, the handle 20 extends approximately one and one-half inches from the connector 22 to the generator 30. In one embodiment, the sides 15, 16 of the housing 12 are substantially flat and parallel to each other, the housing 12 has a substantially rectangular cross-section, the ends 17, 18 of the housing 12 are curved in a convex manner, and the top and bottom sides 13, 14 are curved in a substantially concentric manner, such that the top side 13 is substantially convex and the bottom side 14 is substantially concave. The curved shape of the charger 10 makes it easier for a user to grip the charger 10 with one hand while turning the handle 20 with the other hand. The curved shape also makes the charger 10 more compact, for example, to be carried in a user's pocket. The connector 22 extends through a hole in one of the sides 16, 17, near an end 17, 18 of the housing 12.

Figure 6:
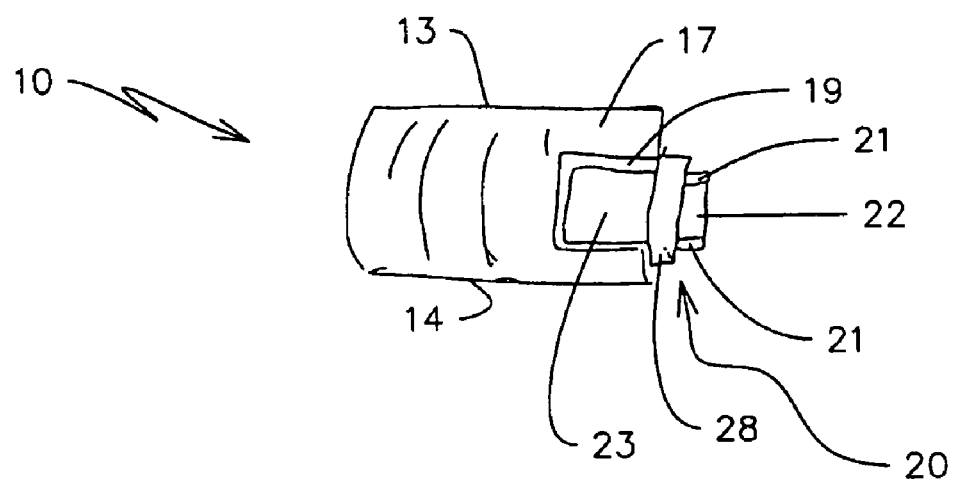
FIG. 6 shows a perspective view of one end of the charger including the cavity that receives the handle.

FIG. 6 shows a perspective view of one end 17 of the charger 10 including the cavity 19 that receives the handle 20. In FIG. 6, the handle 20 is shown in a storage position in which the handle 20 cannot move inadvertently to operate the generator (30 in FIG. 1). The handle 20 includes an end 23 that is pivotally connected to the extension member 28 of the handle 20. The extension member 28 connects the end 23 of the handle 20 to the connector 22. As shown in FIG. 6, in the storage position the end 23 of the handle 20 is contained within the cavity 19, and sides of the cavity prevent the handle 20 from rotating the generator (30 in FIG. 1).

Figure 7:
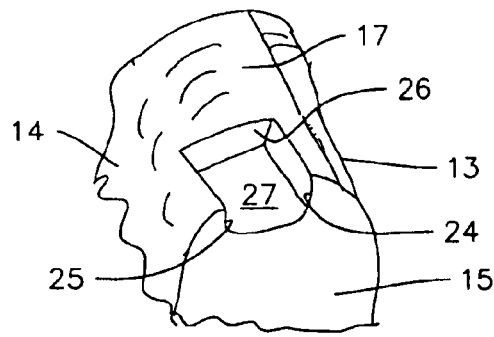
FIG. 7 shows a more detailed perspective view of one embodiment of the cavity in the end of the charger, with the handle removed from the cavity.

FIG. 7 shows a more detailed perspective view of one embodiment of the cavity 19 in the end 17 of the charger 10, with the handle 20 removed from the cavity 19. The cavity 19 includes a bottom 27 and three sides 24, 25, 26. First and second sides 24, 25 are disposed on opposing sides of the end 23 of the handle 20 when the handle 20 is in the storage position. Back side 26 is generally perpendicular to the first and second sides 24, 25.

Figure 8:
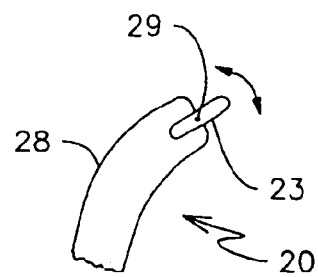
FIG. 8 shows a more detailed perspective view of one embodiment of the handle.

FIG. 8 shows a more detailed perspective view of one embodiment of the handle 20. The handle 20 includes an extension member 28 and an end 23 that is pivotally connected to the extension member 28 at a pivot point 29.

Figure 9:
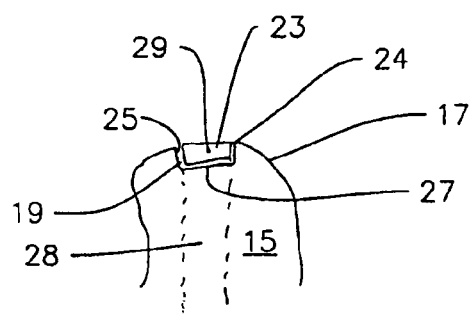
FIG. 9 shows a side view of the charger with the handle received in the cavity in a storage position.

FIG. 9 shows a side view of the charger 10 with the handle 20 received in the cavity 19 in the storage position. In FIG. 9, the extension member 28 of the handle 20 is shown in dashed lines to more clearly show how the end 23 of the handle 20 is received in the cavity 19. As shown in FIG. 9, the first and second sides 24, 25 of the cavity 19 are near opposing sides of the end 23 of the handle 20. The cavity 19 is just slightly wider than the end 23 of the handle 20. In one embodiment, the first and second sides 24, 25 prevent the handle 20 from turning the generator (30 in FIG. 1).

Figure 10:
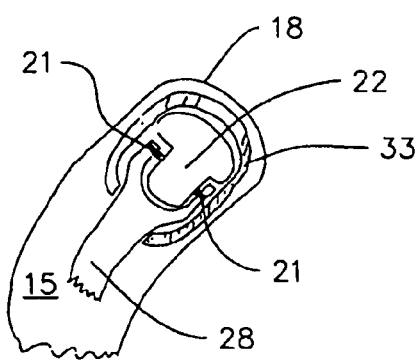
FIG. 10 shows a side view of one embodiment of the connection between the handle and the connector to the generator.

FIG. 10 shows a side view of one embodiment of the connection between the handle 20 and the connector 22 to the generator (30 in FIG. 1). The extension member 28 of the handle 20 is pivotally connected to the connector 22 to allow the handle 20 to move between an operative position and a storage position. In FIG. 10 the handle is shown in the storage position. In the embodiment of FIG. 10, the handle 20 is also locked into position by a ridge 33 formed on the side 15 of the housing 12. As shown, the ridge 33 is raised from the side 15 of the charger 10 and stops on either side of the extension portion 28 of the handle 20. In this embodiment, the ridge 33 prevents the handle 20 from turning the generator (30 in FIG. 1) when the handle 20 is in the storage position. In one embodiment, the ridge 33 is used in addition to the cavity 19 to prevent the handle 20 from turning.

Figure 11:
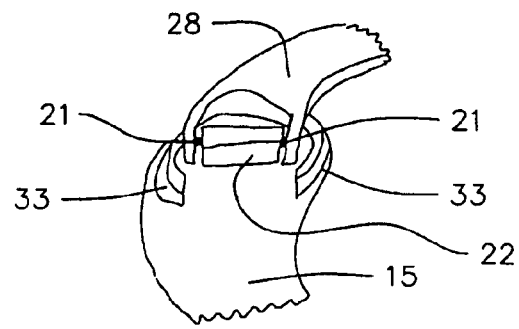
FIG. 11 shows an other view of the ridge shown in FIG. 10, in which the handle is in the operative position.

FIG. 11 shows an other view of the ridge 33 shown in FIG. 10, in which the handle 20 is in the operative position. As shown in FIG. 11, when the handle 20 is in the operative position, the handle 20 is permitted to rotate because the extension member 28 is above the ridge 33. The handle 20 is connected to the connector 22 such that the extension member 28 is nearer the side 15 in the storage position and is further from the side 15 in the operative position. In one embodiment, the extension member 28 abuts the side 15 in the storage position and is just above the ridge 33 in the operative position, as illustrated in FIG. 4.

Although the present invention has been described with respect to particular embodiments thereof, variations are possible. The present invention may be embodied in specific forms without departing from the essential spirit or attributes thereof. In particular, although the invention is illustrated using a particularly circuit schematic with particular circuit component values, one skilled in the art will recognize that various values and schematics will fall within the scope of the invention. It is desired that the embodiments described herein be considered in all respects illustrative and not restrictive and that reference be made to the appended claims and their equivalents for determining the scope of the invention.

What is claimed is:

1. A hand-held, manually-operated battery charger comprising:
   a generator that creates a voltage at an output;
   a handle operably connected to the generator, wherein the generator creates the voltage in response to turning of the handle regardless of whether the handle is turned clockwise or counterclockwise;
   a full-wave bridge rectifier connected to the output of the generator, wherein the bridge rectifier allows the handle to be turned either clockwise or counterclockwise to create the voltage, and converts the voltage to a DC voltage;
   a supercapacitor that stores the DC voltage;
   a connection port that receives a connection cord that provides the DC voltage from the supercapacitor to a battery-charging port of a battery-operated device;
   a superbright light-emitting diode (LED) that receives the DC voltage from the supercapacitor; and
   a switch that switches the DC voltage between the connection port and the LED based upon whether the connection cord is attached to the connection port, wherein the DC voltage is diverted to the connection port when the connection cord is attached to the connection port, and wherein the DC voltage is diverted to the LED when the connection cord is not attached to the connection port.

2. The charger of claim 1, further comprising a housing that encloses the generator, the bridge rectifier, and the supercapacitor, wherein the housing defines a hole through which a connector extends to connect the handle to the generator, such that the handle is positioned outside the housing, and wherein the connection port is accessible from outside of the housing.

3. The charger of claim 2, wherein the handle is pivotally connected to the connector, such that the handle may be positioned in an operable position in which the handle may be turned to operate the generator and in a storage position in which the handle is held in place to prevent the handle from operating the generator, and wherein the housing defines a cavity that receives the handle when the handle is in the storage position, and wherein the cavity is defined by opposing sides that prevent the handle from turning the generator when the handle is in the storage position.

4. The charger of claim 1, further comprising a voltage regulator that limits the DC voltage to a maximum value.

5. The charger of claim 4, wherein the voltage regulator limits the DC voltage to the maximum value of 6.2 volts.

6. The charger of claim 1, wherein the charger weighs less than five ounces.

7. The charger of claim 1, wherein the housing is curved such that top and bottom sides of the housing are substantially concentric, wherein the top side is substantially convex and the bottom side is substantially concave.

8. A battery charger, comprising:
   means for generating a voltage using a handle;
   means for limiting the voltage to a maximum voltage value;
   a supercapacitor that stores the voltage;
   means for providing the voltage to a connection cord and to a light source; and
   means for automatically switching the voltage between the connection cord and the light source, depending upon whether the connection cord is attached to the charger.

9. The charger of claim 8, wherein the means for switching comprises a means for automatically diverting the voltage entirely to the connection cord when the connection cord is connected to the charger and otherwise diverting the voltage entirely to the light source.

10. A battery charger, comprising:
    means for generating a voltage using a handle;
    means for limiting the voltage to a maximum voltage value;
    means for storing the voltage;
    means for providing the voltage to a connection cord and to a light source wherein the light source comprises a superbright LED; and
    means for automatically switching the voltage between the connection cord and the light source, depending upon whether the connection cord is attached to the charger.

11. A battery charger, comprising:
    means for generating a voltage using a handle;
    means for limiting the voltage to a maximum voltage value;
    means for storing the voltage;
    means for providing the voltage to a connection cord and to a light source;
    means for automatically switching the voltage between the connection cord and the light source, depending upon whether the connection cord is attached to the charger; and
    means for positioning the handle in an operable position in which the handle may be turned to generate the voltage and in a storage position in which the handle may not be turned.

12. The charger of claim 11, further comprising a housing that encloses the means for generating, the means for limiting, the means for storing, the means for providing, and means for switching, and
    wherein the handle is received in a cavity formed in an end of an outside portion of the housing, when the handle is in the locked position, wherein sides of the cavity limit movement of the handle.

13. A battery charger, comprising:
    means for generating a voltage using a handle;
    means for limiting the voltage to a maximum voltage value of 6.2 volts;
    means for storing the voltage;
    means for providing the voltage to a connection cord and to a light source; and
    means for automatically switching the voltage between the connection cord and the light source, depending upon whether the connection cord is attached to the charger.

14. A method of charging a battery, comprising:
    generating a voltage in response to a user's manual rotation of a handle;
    limiting the voltage to a maximum value;
    storing the voltage with a supercapacitor;
    selecting between a connection port and a light source; and
    providing the voltage to the connection port when the connection port is selected and to the light source when the light source is selected.

15. The method of claim 14, wherein the step of selecting comprises automatically selecting the connection port if a connection cord is attached to the connection port, and otherwise selecting the light source.

16. The method of claim 15, further comprising:
connecting the connection cord to a wireless telephone; and
charging a battery of the telephone with the voltage, when the connection cord is attached to the connection port.

17. The method of claim 14, wherein the light source comprises a superbright LED having a brightness in the range of 6,000 to 10,000 millicandela, and wherein the connection port and the superbright LED are disposed in a housing and are accessible from outside the housing.

18. The method of claim 14, wherein the step of limiting comprises limiting the voltage to a range of 4.5–12 volts.

19. The method of claim 14, wherein the step of providing comprises providing the voltage only to the connection port when the connection port is selected and providing the voltage only to the light source when the light source is selected.

20. The method of claim 14, wherein the step of generating comprises generating the voltage using a generator and a full-wave bridge rectifier that converts the voltage to a DC voltage, wherein the bridge rectifier allows the generator to create a voltage regardless of whether the handle is rotated clockwise or counterclockwise, and wherein the handle is connected to the generator using a series of gears having a gear ratio in the range of 36:1 to 300.1.

21. A method of charging a battery, comprising:
generating a voltage in response to a user's manual rotation of a handle;
limiting the voltage to a maximum value in a range of 4.5–12 volts;
storing the voltage;
selecting between a connection port and a light source; and
providing the voltage to the connection port when the connection port is selected and to the light source when the light source is selected.

* * * * *